(12) United States Patent
Fukui et al.

(10) Patent No.: US 11,840,302 B2
(45) Date of Patent: Dec. 12, 2023

(54) AIR CLEANER

(71) Applicant: SUZUKI MOTOR CORPORATION, Hamamatsu (JP)

(72) Inventors: Akihito Fukui, Hamamatsu (JP); Shintaro Yagi, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 0 days.

(21) Appl. No.: 17/852,950

(22) Filed: Jun. 29, 2022

(65) Prior Publication Data

US 2023/0036301 A1 Feb. 2, 2023

(30) Foreign Application Priority Data

Jul. 27, 2021 (JP) .................................. 2021-122506

(51) Int. Cl.
*B62J 40/00* (2020.01)
*F02M 35/02* (2006.01)
*F02M 35/04* (2006.01)
*F02M 35/024* (2006.01)

(52) U.S. Cl.
CPC .......... *B62J 40/00* (2020.02); *F02M 35/0201* (2013.01); *F02M 35/02475* (2013.01); *F02M 35/044* (2013.01); *F02M 35/048* (2013.01)

(58) Field of Classification Search
CPC ................. B62J 40/00; F02M 35/0201; F02M 35/02475; F02M 35/044; F02M 35/048; B62K 11/04
See application file for complete search history.

(56) References Cited

FOREIGN PATENT DOCUMENTS

JP         4121392 B2    5/2008
WO    WO-2021065733 A1 *  4/2021

* cited by examiner

*Primary Examiner* — Jacob M Amick
*Assistant Examiner* — Charles J Brauch
(74) *Attorney, Agent, or Firm* — Stein IP, LLC

(57) ABSTRACT

There is provided an air cleaner configured to be disposed behind an engine and inside a vehicle body frame. The air cleaner includes: an air cleaner case in which an intake chamber is formed; an air filter that divides the intake chamber into a dirty side and a clean side; an inlet tube configured to take in air from a vehicle rear side to the dirty side; and an outlet tube configured to send air from the clean side to the engine. The inlet tube and the outlet tube are attached to an upper side of the air cleaner case, and an expansion portion is formed on a lower side of the air cleaner case, the expansion portion being formed by expanding the clean side further downward than the dirty side.

7 Claims, 9 Drawing Sheets

AIR CLEANER

CROSS-REFERENCE TO RELATED APPLICATIONS

This application is based on Japanese Patent Application No. 2021-122506 filed on Jul. 27, 2021, the contents of which are incorporated herein by way of reference.

TECHNICAL FIELD

The present invention relates to an air cleaner.

BACKGROUND

As a straddle-type vehicle, there is known a straddle-type vehicle in which an air cleaner is disposed behind an engine (for example, see Patent Literature 1). In the air cleaner disclosed in Patent Literature 1, an inlet tube is attached to a rear surface of an air cleaner case, and an outlet tube is attached to a front surface of the air cleaner case. Air is taken into the air cleaner case from the inlet tube, and the air is filtered by a filter disposed in the air cleaner. Then, the clean air enters the outlet tube from the air cleaner, and the clean air is sent out to a throttle body through the outlet tube.
Patent Literature 1: Japanese Patent No. 4121392

However, the air cleaner described in Patent Document 1 is disposed in a narrow space inside a vehicle body frame below a seat. Therefore, it is difficult to secure a volume of the air cleaner that satisfies a required output of the engine. In particular, there is a problem that an amount of air is insufficient when a throttle is rapidly opened.

The present invention has been made in view of the above, and an object of the present invention is to provide an air cleaner capable of improving an output from a low rotation speed to a high rotation speed of an engine even when the air cleaner is disposed behind the engine.

SUMMARY

According to an aspect of the present invention, there is provided an air cleaner configured to be disposed behind an engine and inside a vehicle body frame. The air cleaner includes: an air cleaner case in which an intake chamber is formed; an air filter that divides the intake chamber into a dirty side and a clean side; an inlet tube configured to take in air from a vehicle rear side to the dirty side; and an outlet tube configured to send air from the clean side to the engine. The inlet tube and the outlet tube are attached to an upper side of the air cleaner case, and an expansion portion is formed on a lower side of the air cleaner case, the expansion portion being formed by expanding the clean side further downward than the dirty side.

DESCRIPTION OF EMBODIMENTS

An air cleaner according to an aspect of the present invention is disposed behind an engine and inside a vehicle body frame. An intake chamber is formed in an air cleaner case of the air cleaner, and the intake chamber is divided into a dirty side and a clean side by an air filter. Air is taken into the dirty side from a vehicle rear side through an inlet tube, and air is sent from the clean side to the engine through an outlet tube. The inlet tube and the outlet tube are attached to an upper side of the air cleaner case, and air easily flows directly from the inlet tube to the outlet tube. Therefore, the air smoothly flows toward the engine from a low rotation speed to a high rotation speed of the engine, and the engine output is improved. An expansion portion is formed on a lower side of the air cleaner case by expanding the clean side further downward than the dirty side, and a volume of the clean side is sufficiently secured even in a narrow space inside the vehicle body frame. Therefore, even when a throttle is rapidly opened, air inside the expansion portion is used to improve the engine output.

EMBODIMENT

Figure 1:
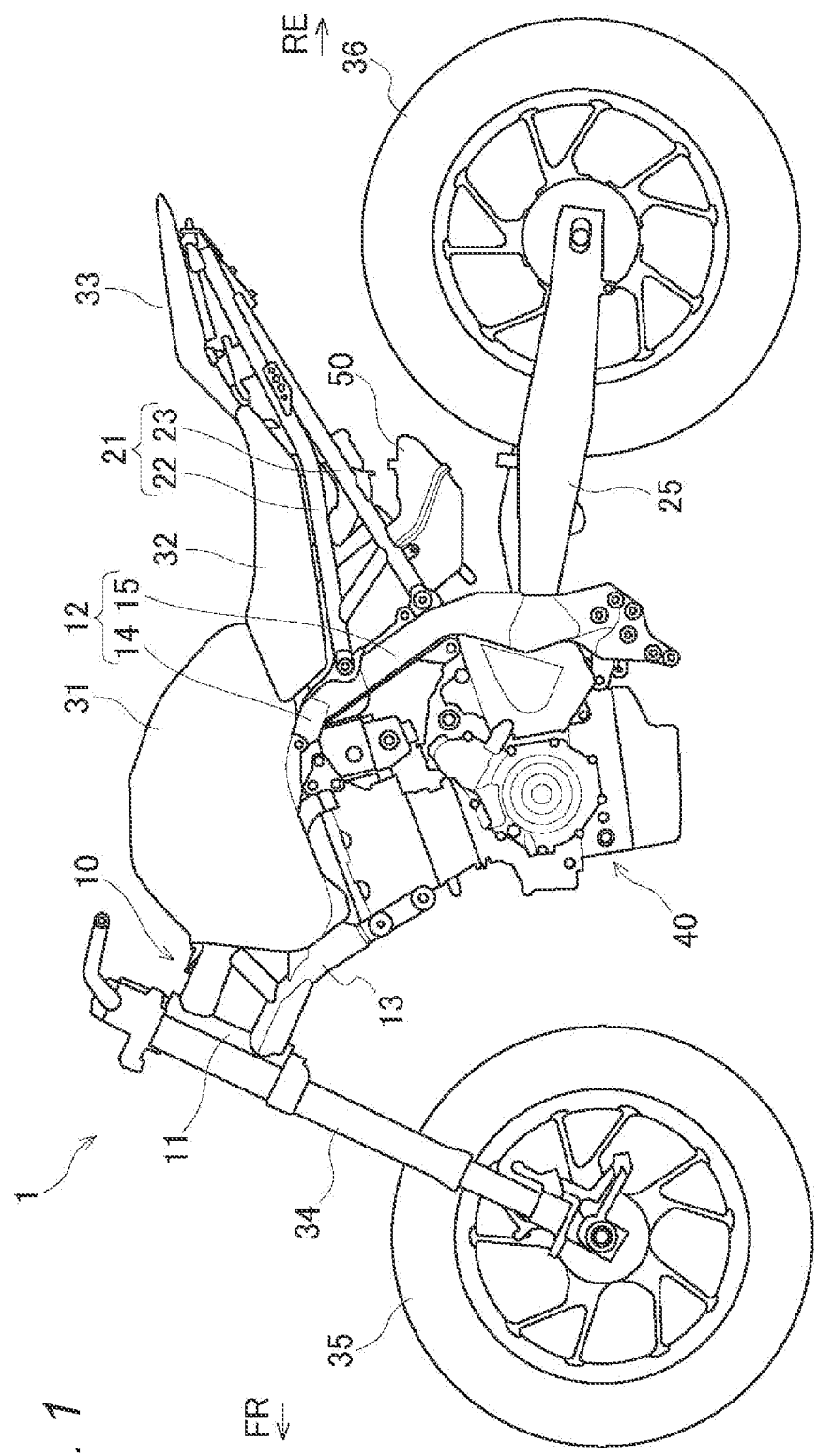
FIG. 1 is a left side view of a straddle-type vehicle according to an embodiment.

Hereinafter, an embodiment will be described in detail with reference to the accompanying drawings. FIG. 1 is a left side view of a straddle-type vehicle according to the present embodiment. In addition, in the drawings to be described later, an arrow FR indicates a vehicle front side, an arrow RE indicates a vehicle rear side, an arrow L indicates a vehicle left side, and an arrow R indicates a vehicle right side.

As shown in FIG. 1, a straddle-type vehicle 1 is formed by mounting various components such as an engine 40 and an electrical system on a diamond-type vehicle body frame 10 formed of a pipe and a sheet metal. The vehicle body frame 10 includes a pair of main frames 12 that are branched off from a head pipe 11 to the left and right and extend rearward, and a pair of down frames 13 that are branched off from the head pipe 11 to the left and right and extend downward. A rear portion of the engine 40 is supported by the pair of main frames 12, and a front portion of the engine 40 is supported by the pair of down frames 13. By supporting the engine 40 with the vehicle body frame 10, the rigidity of an entire vehicle is secured.

A front side portion of the main frame 12 is a tank rail 14 located above the engine 40, and a fuel tank 31 is supported from below by the tank rail 14. A rear side portion of the main frame 12 is a body frame 15 located behind the engine 40, and a swing arm 25 is swingably supported by a lower half portion of the body frame 15. A seat rail 21 including an upper rail 22 and a lower rail 23 is attached to an upper half portion of the body frame 15. A rider seat 32 and a pillion seat 33 are supported on an upper portion of the upper rail 22 at the rear of the fuel tank 31.

A pair of front forks 34 is steerably supported by the head pipe 11 via a steering shaft (not shown). A front wheel 35 is rotatably supported by lower portions of the front forks 34, and an upper portion of the front wheel 35 is covered with a front fender (not shown). The swing arm 25 extends rearward from the body frame 15. A rear wheel 36 is rotatably supported at a rear end of the swing arm 25, and an upper side of the rear wheel 36 is covered with a rear fender (not shown). The engine 40 is coupled to the rear wheel 36 via a chain drive type transmission mechanism, and power from the engine 40 is transmitted to the rear wheel 36 via the transmission mechanism.

Meanwhile, there is a demand for an air cleaner that is effective for a model, in which a two-cylinder engine is mounted and which has a narrow vehicle width, and for a model in which an output is required even during a high rotation speed. In a case of a model in which the air cleaner is disposed behind the engine, an arrangement space of the air cleaner is limited by a frame width of the main frame and a rail width of the seat rail. Therefore, it is difficult to secure the volume of the air cleaner, and an intake air amount is insufficient particularly when the throttle is rapidly opened. Therefore, in the straddle-type vehicle 1 of the present embodiment, a lower portion of the air cleaner 50 is expanded downward to secure the volume such that the air cleaner 50 does not interfere with the seat rail 21.

Figure 2:
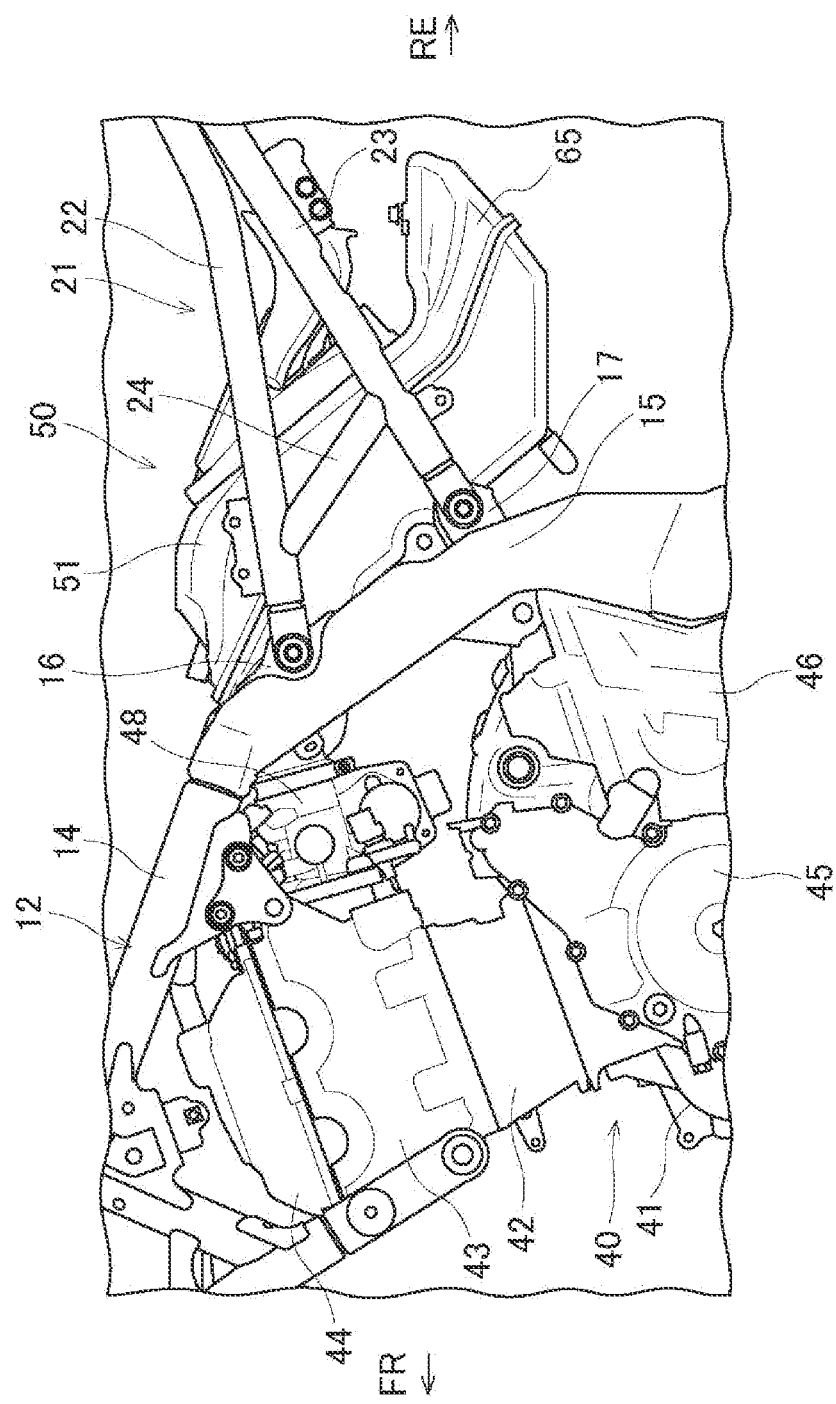
FIG. 2 is a left side view of a periphery of an engine according to the present embodiment.
Figure 3:
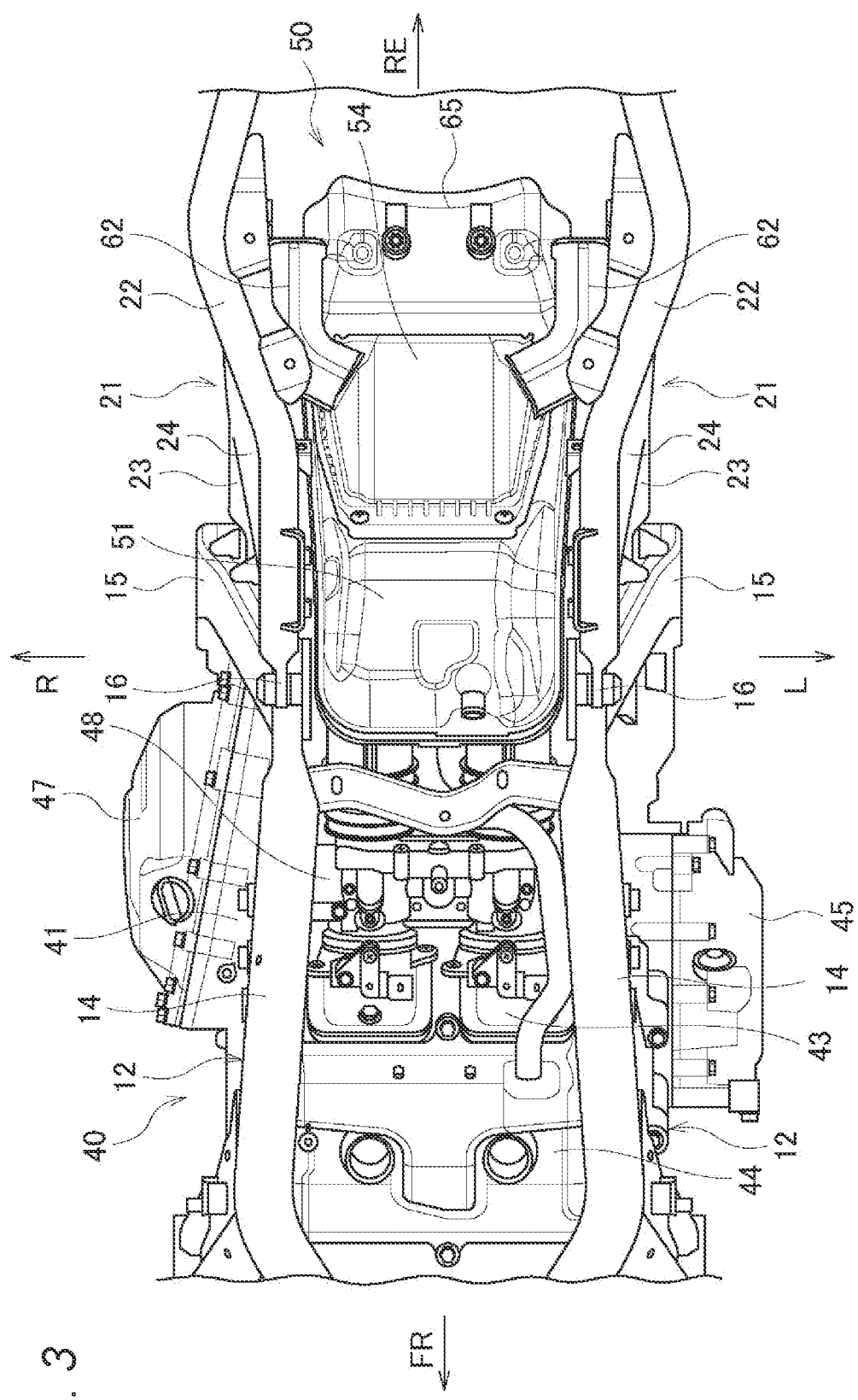
FIG. 3 is a top view of the periphery of the engine according to the present embodiment.
Figure 4:
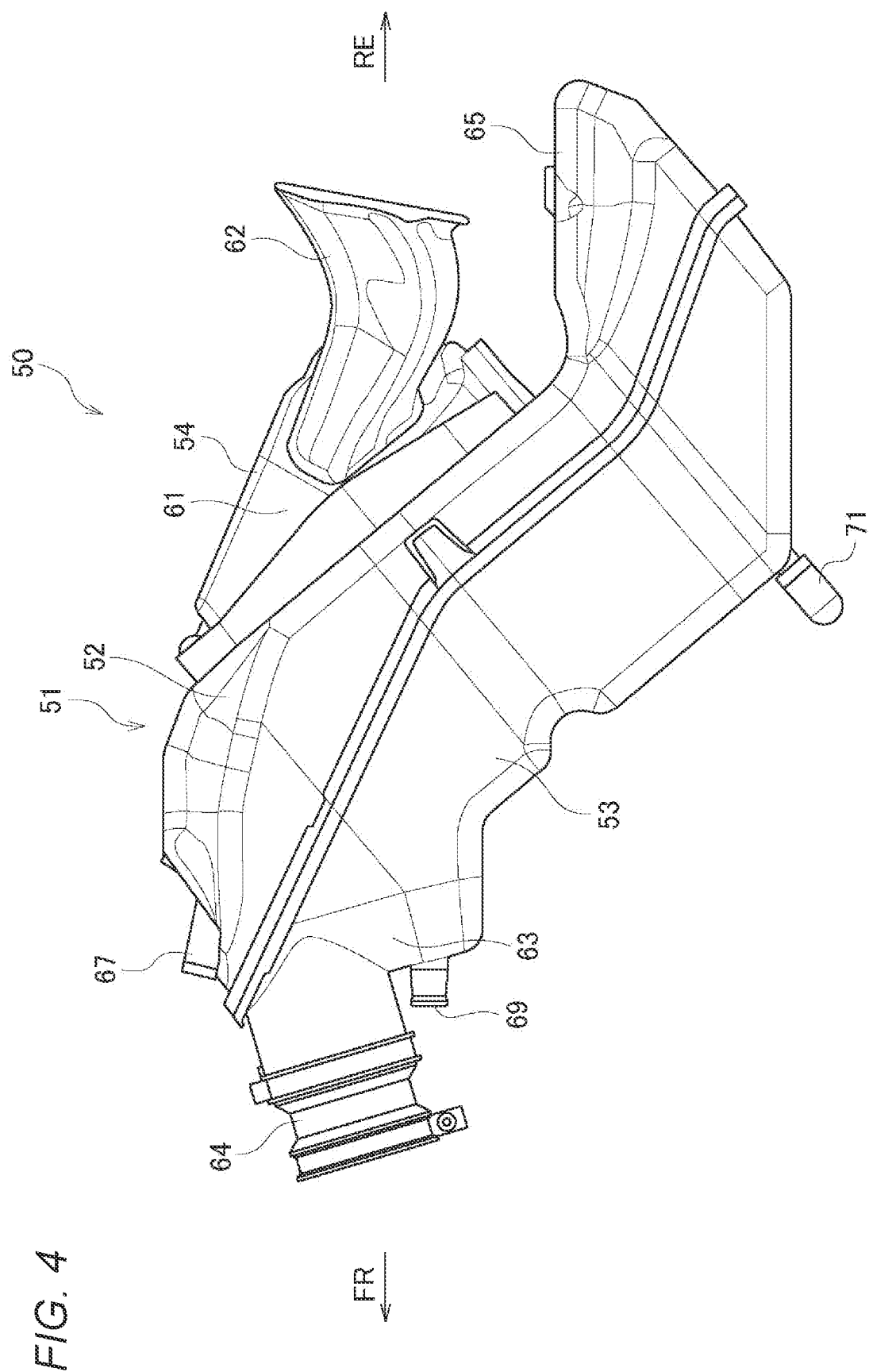
FIG. 4 is a side view of an air cleaner according to the present embodiment.
Figure 5:
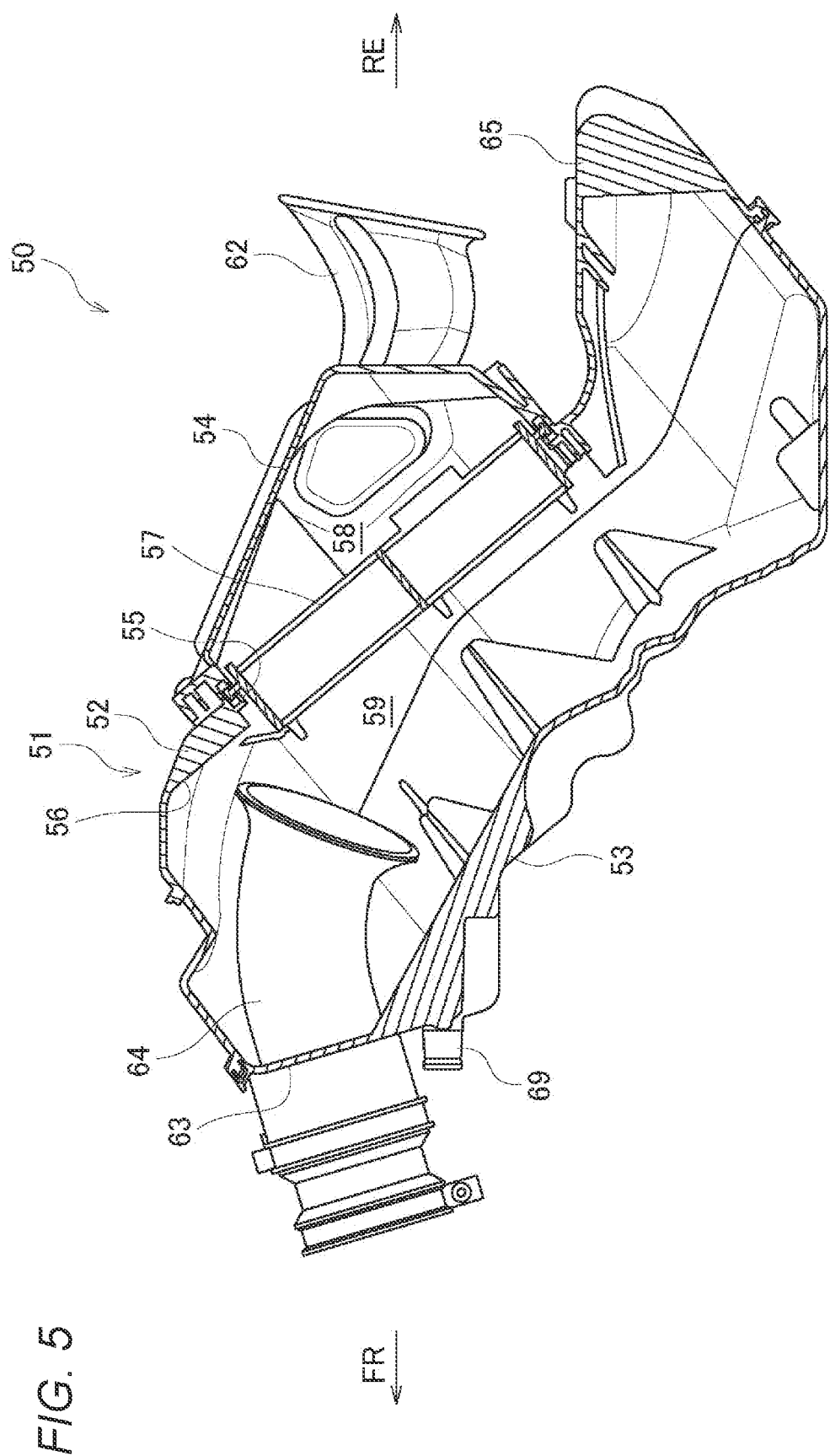
FIG. 5 is a cross-sectional view of the air cleaner according to the present embodiment.
Figure 6:
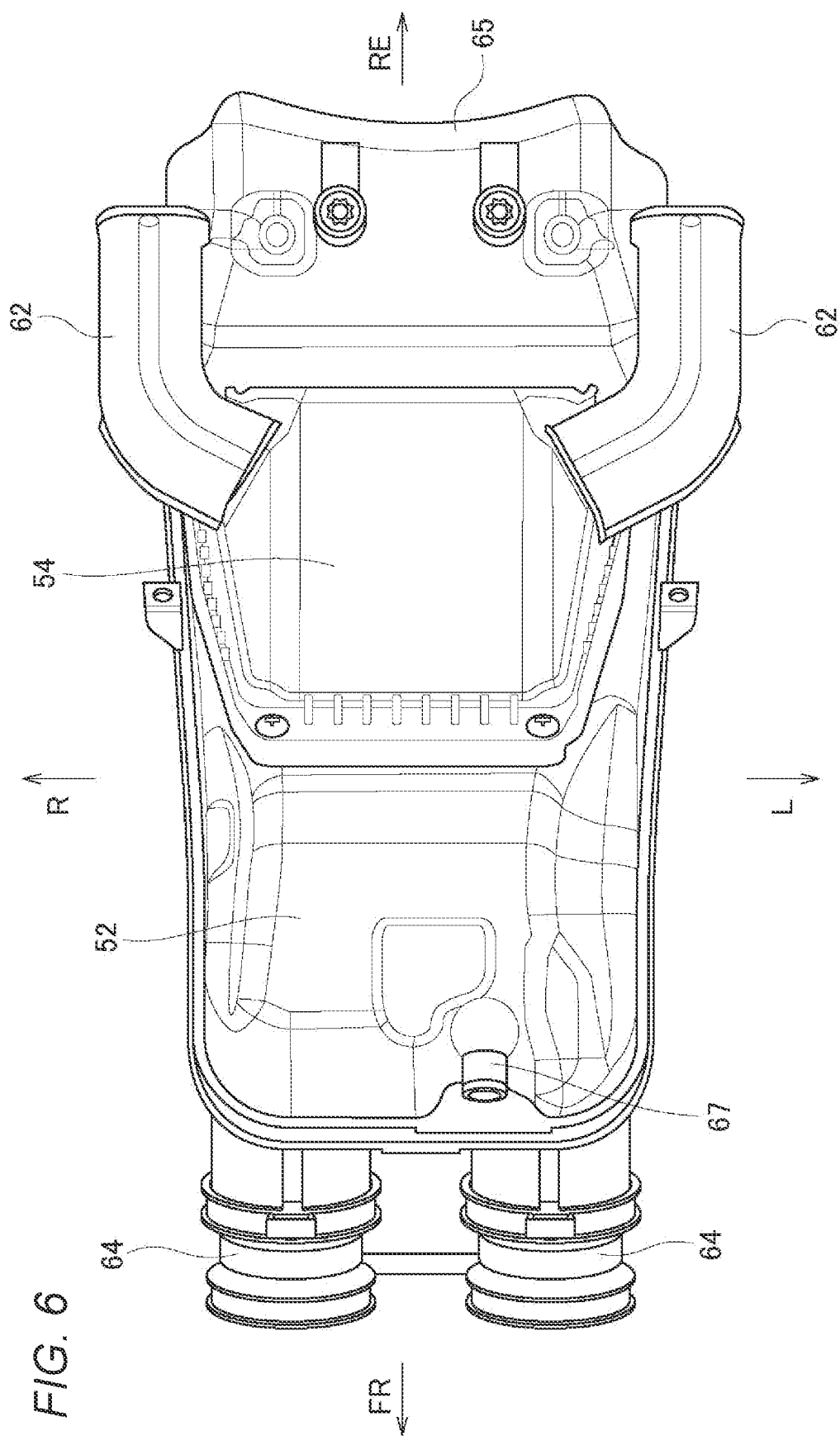
FIG. 6 is a top view of the air cleaner according to the present embodiment.
Figure 7:
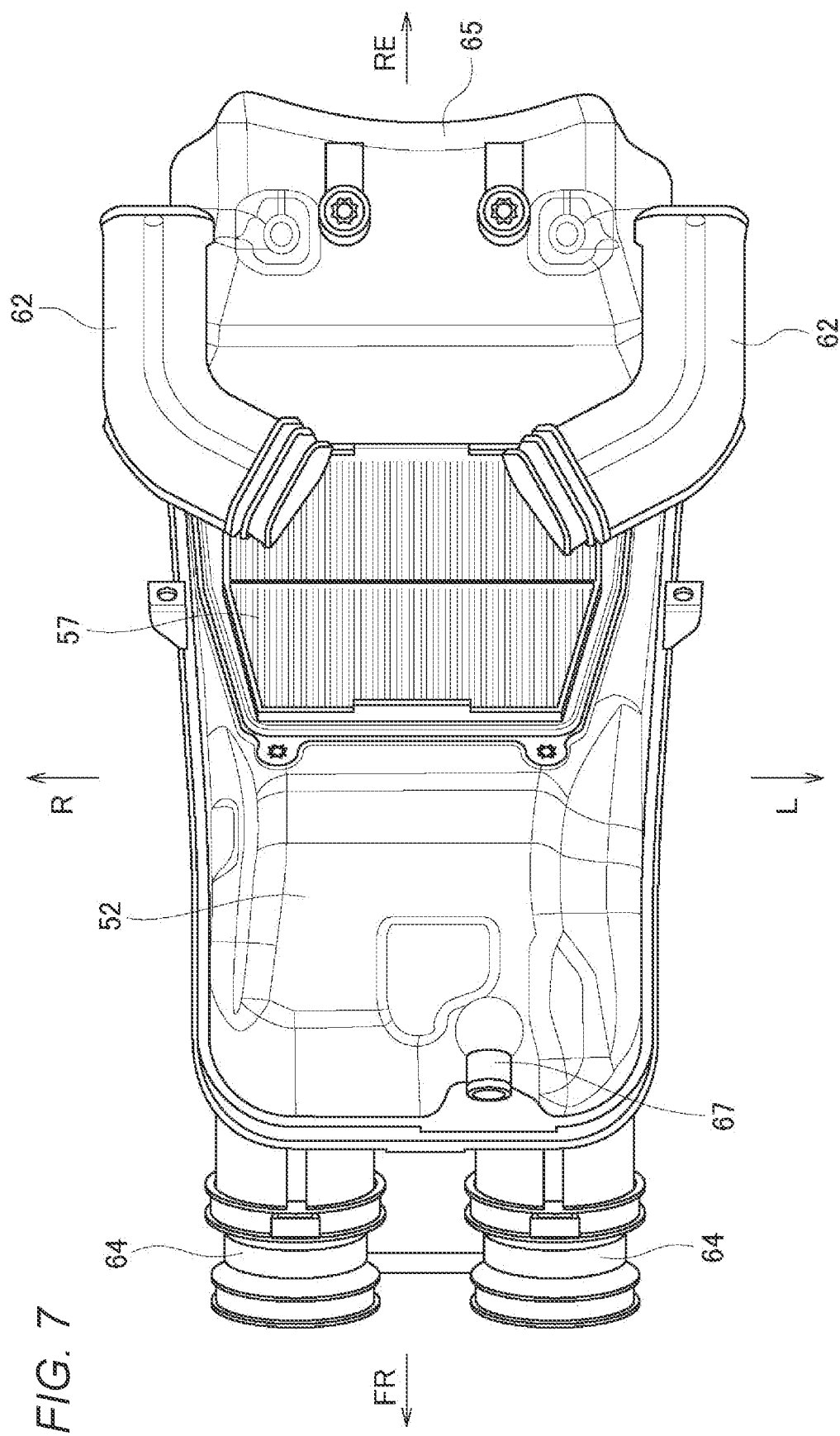
FIG. 7 is a top view of the air cleaner of FIG. 6 from which a filter cover is removed.
Figure 8:
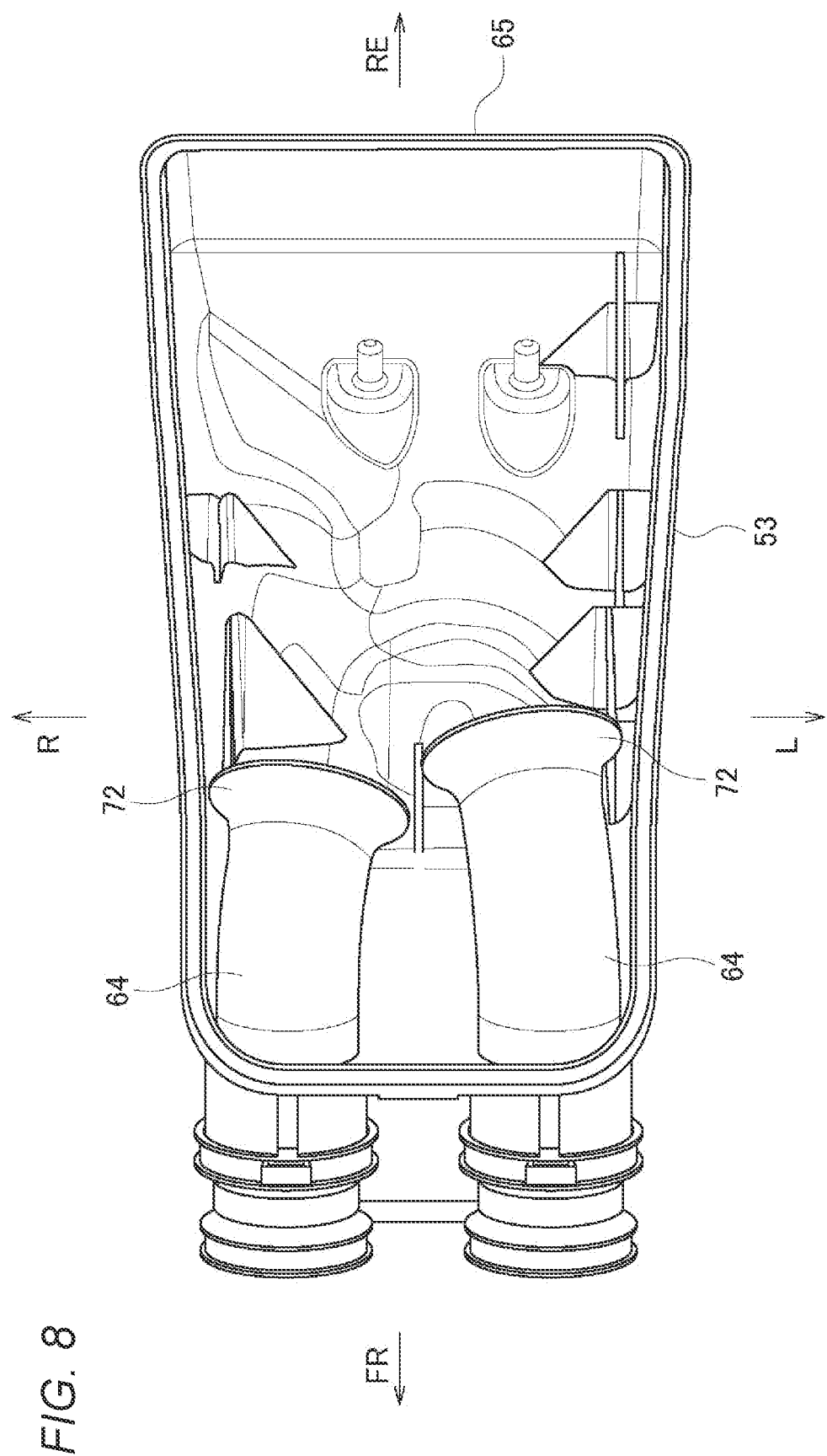
FIG. 8 is a top view of the air cleaner of FIG. 7 from which an upper case is removed.

A peripheral configuration of the engine and the air cleaner will be described with reference to FIGS. 2 to 8. FIG. 2 is a left side view of a periphery of the engine according to the present embodiment. FIG. 3 is a top view of the periphery of the engine according to the present embodiment. FIG. 4 is a side view of the air cleaner according to the present embodiment. FIG. 5 is a cross-sectional view of the air cleaner according to the present embodiment. FIG. 6 is a top view of the air cleaner according to the present embodiment. FIG. 7 is a top view of the air cleaner of FIG. 6 from which a filter cover is removed. FIG. 8 is a top view of the air cleaner of FIG. 7 from which an upper case is removed.

As shown in FIGS. 2 and 3, the engine 40 is a two-cylinder engine, and includes a crankcase 41 having an upper-lower divided structure. A cylinder 42, a cylinder head 43, and a cylinder head cover 44 are attached to an upper portion of the crankcase 41. A magneto cover 45 that covers a magneto (not shown) from a side is attached to a left side surface of the crankcase 41. A sprocket cover 46 that covers a drive sprocket (not shown) from the side is attached to the rear of the magneto cover 45. A clutch cover 47 that covers a clutch (not shown) from the side is attached to a right side surface of the crankcase 41.

A throttle body 48 is connected to a rear surface of the cylinder head 43, and the air cleaner 50 is connected to an upstream side (rear side) of the throttle body 48. The air cleaner 50 is disposed behind the engine 40 and inside the pair of main frames 12 and the pair of seat rails 21. As described above, the rear portions of the pair of main frames 12 are the pair of body frames 15, and a front end portion of the air cleaner 50 is located inside the pair of body frames 15. The upper half portion of the body frame 15 is inclined obliquely downward toward the rear, and an air cleaner case 51 behind the body frame 15 is also inclined obliquely downward.

An upper bracket 16 and a lower bracket 17 are formed at a rear edge of the upper half portion of the body frame 15. The upper rail 22 of the seat rail 21 is connected to the upper bracket 16, and the lower rail 23 of the seat rail 21 is connected to the lower bracket 17. The upper rail 22 extends rearward across a side of an upper half portion of the air cleaner case 51, and the lower rail 23 extends obliquely rearward across a side of a lower half portion of the air cleaner case 51. Front sides of the upper rail 22 and the lower rail 23 are coupled to each other via a bridge 24, and rear sides of the upper rail 22 and the lower rail 23 are coupled to each other at a vehicle rear portion.

A front portion of the air cleaner case 51 protrudes upward from the upper rail 22, and a protruding portion of the front portion is accommodated in a space inside the rider seat 32 (see FIG. 1). A rear portion of the air cleaner case 51 protrudes downward from the lower rail 23, and a protruding portion of the rear portion serves as an expansion portion 65 that expands an intake chamber in the air cleaner case 51. The expansion portion 65 of the air cleaner case 51 is located above the swing arm 25 (see FIG. 1), and the expansion portion 65 extends rearward so as to avoid a swing range of the swing arm 25. Accordingly, a volume of the air cleaner case 51 is expanded by using a lower space of the seat rail 21.

As shown in FIGS. 4 and 5, the air cleaner case 51 of the air cleaner 50 includes an upper case 52 and a lower case 53 which are divided in an upper-lower direction, and a filter cover 54 attached to a rear surface of the upper case 52. The upper case 52 and the lower case 53 extend obliquely downward from the front to the rear, and the filter cover 54 bulges in a dome shape on a rear side of the upper case 52. Internal spaces of the upper case 52 and the lower case 53 and an internal space of the filter cover 54 are connected to each other through an opening 55 formed in the rear surface of the upper case 52, and an intake chamber 56 is formed inside the air cleaner 50.

An air filter 57 is disposed in the opening 55 in the rear surface of the upper case 52, and the air filter 57 is covered by the filter cover 54 from behind. The air filter 57 is inclined along an upper surface of the upper case 52 such that an upper portion of the air filter 57 is located closer to the vehicle front side than a lower portion. As air is purified by the air filter 57, the intake chamber 56 is divided into a dirty side 58 and a clean side 59. That is, the dirty side 58 is formed by the filter cover 54 on the upstream side of the air filter 57, and the clean side 59 is formed by the upper case 52 and the lower case 53 on the downstream side of the air filter 57.

A pair of inlet tubes 62 is attached to left and right side surfaces 61 of the filter cover 54. The pair of inlet tubes 62 extends from the left and right side surfaces 61 of the filter cover 54 toward the vehicle rear side, and air is taken into the dirty side 58 from the rear of the vehicle by the pair of inlet tubes 62. A pair of outlet tubes 64 is attached to a front surface 63 of the lower case 53. The pair of outlet tubes 64 penetrate the front surface 63 of the lower case 53 and extend in a front-rear direction, and air is sent from the clean side 59 to the engine 40 (see FIG. 1) by the pair of outlet tubes 64.

The inlet tube 62 and the outlet tube 64 are attached to an upper side of the air cleaner case 51. As described above, the inlet tube 62 is attached to the filter cover 54, the outlet tube 64 is attached to the front surface 63 of the lower case 53, and the filter cover 54 and the front surface 63 of the lower case 53 face each other in the front-rear direction via the air filter 57 in a side view. Since a downstream end of the inlet tube 62 and an upstream end of the outlet tube 64 are located at substantially the same height, air easily flows directly from the inlet tube 62 to the outlet tube 64.

The upper case 52 and the lower case 53 protrude downward from the filter cover 54, and the expansion portion 65 is formed on the lower side of the air cleaner case 51. In addition, the expansion portion 65 extends to the vehicle rear side with respect to the inlet tube 62. The expansion portion 65 expands the clean side 59 downward and to the vehicle rear side with respect to the dirty side 58, and a volume of the clean side 59 is sufficiently secured such that the amount of air does not become insufficient when the throttle is rapidly opened. In addition, the expansion portion 65 has a volume that suppresses noise due to intake pulsation. Since the expansion portion 65 is located below the inlet tube 62, the expansion portion 65 serves as a wall to suppress suction of dust and the like into the inlet tube 62.

The upstream end (rear end) of the outlet tube 64 is located at substantially the same height as the upper portion of the air filter 57. In addition, the upstream end of the outlet tube 64 faces the expansion portion 65. Therefore, air easily enters the outlet tube 64 from the dirty side via the air filter 57, and air easily enters the outlet tube 64 from the expansion portion 65 of the clean side 59.

In addition, a breather nipple 67 is formed at a front portion of the upper case 52, and a breather hose (not shown) extending from the engine 40 is connected to the breather nipple 67. A secondary air nipple 69 is formed at a front portion of the lower case 53, and a secondary air hose (not shown) extending to an exhaust system is connected to the secondary air nipple 69. A drain plug 71 is provided at a bottom portion of the lower case 53, and water in the air cleaner case 51 is discharged from the drain plug 71.

As shown in FIGS. 6 and 7, the air filter 57 is entirely covered with the filter cover 54 from above. As described above, the pair of inlet tubes 62 is attached to the filter cover 54, and the pair of inlet tubes 62 is located on an outer side of the upper case 52 in a left-right direction in a top view. Upstream sides (rear sides) of the pair of inlet tubes 62 extend toward the vehicle rear side along the seat rail 21 (see FIG. 3), and downstream sides (front sides) of the pair of inlet tubes 62 are directed toward a center of the air filter 57. Air easily flows from the pair of inlet tubes 62 toward the center of the air filter 57.

As shown in FIGS. 7 and 8, the pair of outlet tubes 64 is attached to the front surface of the lower case 53 so as to be spaced apart from each other in the left-right direction. Upstream sides (rear sides) of the pair of outlet tubes 64 extend toward the air filter 57, and downstream sides (front sides) of the pair of outlet tubes 64 are connected to the throttle body 48 (see FIG. 3). Lengths of the pair of outlet tubes 64 are different, and the outlet tube 64 on the left side is formed longer than the outlet tube 64 on the right side. The output characteristics of the engine 40 are adjusted by the difference in length between the pair of outlet tubes 64.

Since the upstream sides of the pair of outlet tubes 64 are directed toward the center of the air filter 57, air easily flows from the pair of inlet tubes 62 to the pair of outlet tubes 64 through the center of the air filter 57. The pair of outlet tubes 64 is formed with umbrella portions 72 that extend toward the upstream ends, and the umbrella portions 72 allow air to easily flow into the outlet tubes 64. Since the lengths of the pair of outlet tubes 64 are different from each other and the umbrella portions 72 of the pair of outlet tubes 64 are shifted in the front-rear direction, a pair of umbrella portions 72 does not interfere with each other at the center of the air filter 57.

Figure 9:
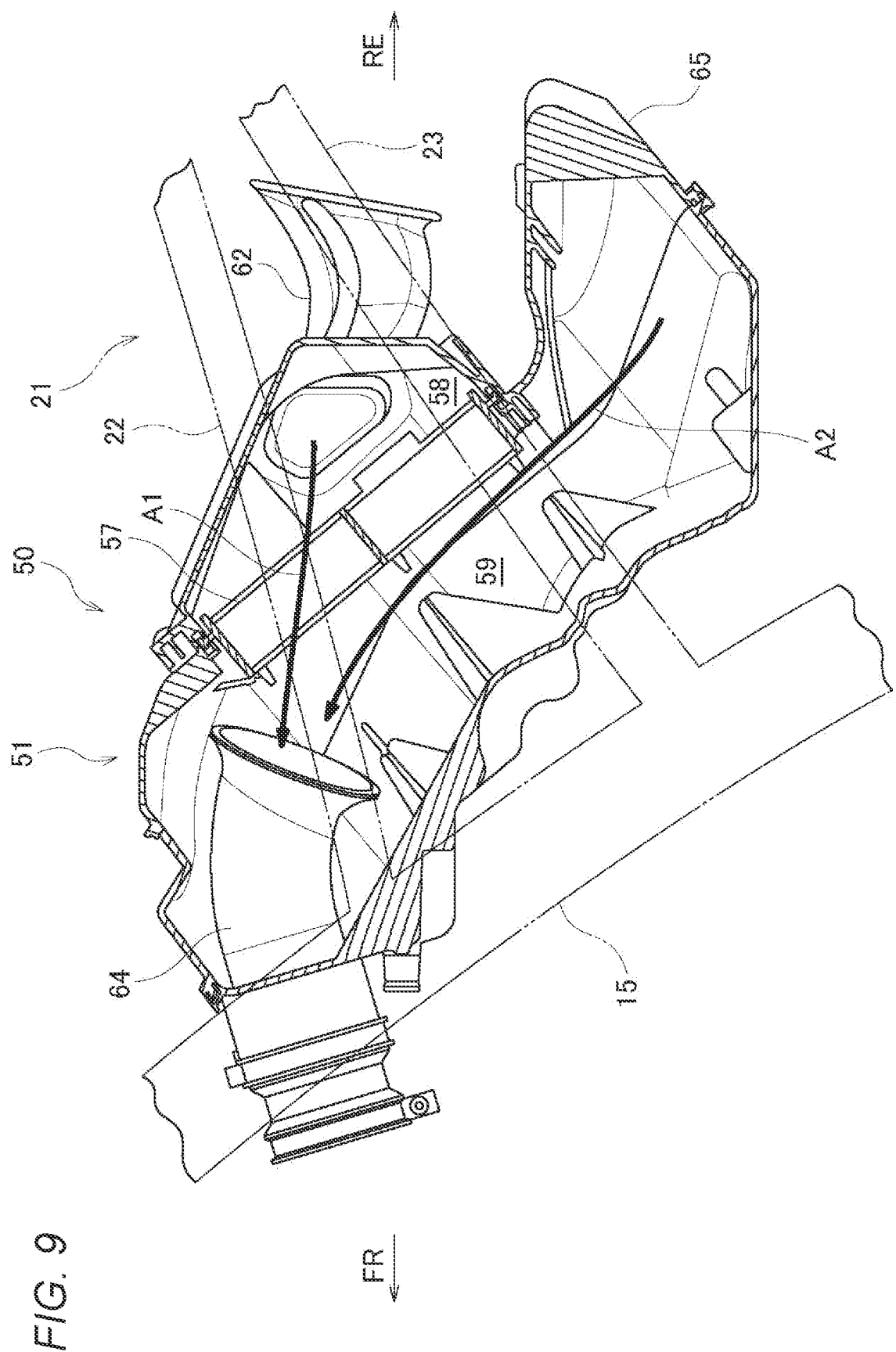
FIG. 9 is a diagram showing a flow of air in the air cleaner according to the present embodiment.

A positional relationship between the air cleaner and the vehicle body frame and the flow of air in the air cleaner will be described with reference to FIG. 9. FIG. 9 is a diagram showing the flow of air in the air cleaner according to the present embodiment.

As shown in FIG. 9, a rear side of the air cleaner case 51 is supported by the seat rail 21, and a front side of the air cleaner case 51 is supported by the throttle body 48 (see FIG. 2) via the pair of outlet tubes 64. The pair of outlet tubes 64 is located between the pair of body frames 15, and the pair of inlet tubes 62 is located between the pair of seat rails 21. The front portion of the air cleaner case 51 protrudes obliquely forward and upward from the upper rail 22 of each of the seat rails 21, and the expansion portion 65 of the lower portion of the air cleaner case 51 protrudes obliquely rearward and downward from the lower rail 23 of each of the seat rails 21.

As described above, the upper portion of the air filter 57 is inclined so as to be closer to the vehicle front side than the lower portion in a side view. The upper portion of the air filter 57 is located above the upper rail 22, and the air filter 57 is located above the lower rail 23. The downstream end (front end) of the inlet tube 62 faces the center of the front surface of the air filter 57, and the upstream end (rear end) of the outlet tube 64 faces the upper portion of the back surface of the air filter 57. Since the center of the front surface and the upper portion of the back surface of the inclined air filter 57 have substantially the same height, the downstream end of the inlet tube 62 and the upstream end of the outlet tube 64 face each other with the air filter 57 interposed therebetween.

The expansion portion 65 formed by expanding the clean side 59 is located below the air filter 57. The expansion portion 65 extends below the lower rail 23 and toward the vehicle rear side with respect to the air filter 57, and expands the clean side 59 downward and toward the vehicle rear side with respect to the dirty side 58. Since the clean side 59 is expanded downward and toward the vehicle rear side by the expansion portion 65, the volume of the clean side 59 is sufficiently secured even in a model with a narrow vehicle width equipped with a two-cylinder engine. Since the expansion portion 65 is located below the air filter 57, by the expansion portion 65, the flow of air from the inlet tube 62 to the outlet tube 64 is not hindered.

From a low rotation speed to a high rotation speed of the engine 40, air is taken into the dirty side 58 from the inlet tube 62, and as indicated by an arrow A1, the air flows toward the vehicle front side from the center of the front surface of the air filter 57 toward the upper portion of the back surface thereof. Air enters the outlet tube 64 of the clean side 59 from the upper portion of the back surface of the air filter 57, and the air is sent out to the engine 40 through the outlet tube 64. Accordingly, the air mainly flows forward on an upper side of the air cleaner 50, and the air easily flows from the inlet tube 62 to the outlet tube 64 with the air filter 57 interposed therebetween, such that the engine output is improved.

When the throttle is rapidly opened, the air flows from the inlet tube 62 into the dirty side 58 as indicated by the arrow A1, and the air also flows from the expansion portion 65 into the outlet tube 64 as indicated by an arrow A2. Since the upstream end (rear end) of the outlet tube 64 faces obliquely rearward and downward, the air easily flows from the expansion portion 65 toward the outlet tube 64. Accordingly, in addition to the direct flow of the air from the inlet tube 62 to the outlet tube 64, the air is sucked out to the outlet tube 64 from an air reservoir inside the expansion portion 65, such that the intake pulsation effect is enhanced and the engine output is improved.

As described above, according to the present embodiment, since the inlet tube 62 and the outlet tube 64 are attached to the upper side of the air cleaner case 51, the air easily flows directly from the inlet tube 62 to the outlet tube 64. Therefore, the air smoothly flows toward the engine 40 from a low rotation speed to a high rotation speed of the engine 40, and the engine output is improved. Since the air cleaner case 51 is formed with the expansion portion 65 in which the clean side 59 is expanded obliquely rearward and downward of the dirty side 58, the volume of the clean side 59 is sufficiently secured even in a narrow space inside the vehicle body frame 10. Therefore, even when the throttle is rapidly opened, the air inside the expansion portion 65 is used to improve the engine output.

In the present embodiment, the expansion portion expands the clean side obliquely rearward and downward of the dirty side, but the expansion portion may expand the clean side at least downward of the dirty side.

In addition, in the present embodiment, a two-cylinder engine is exemplified as the engine, but the type of the engine is not particularly limited.

Further, in the present embodiment, the downstream end of the inlet tube and the upstream end of the outlet tube are located at substantially the same height, but the inlet tube and the outlet tube may be attached to at least the upper side of the air cleaner case. As long as a direct flow of air from the inlet tube to the outlet tube is created, the inlet tube and the outlet tube may be displaced in an upper-lower direction.

In addition, in the present embodiment, the upstream end of the outlet tube faces the expansion portion, but the orientation of the upstream end of the outlet tube is not particularly limited as long as air enters the outlet tube from the expansion portion.

In addition, in the present embodiment, the air filter is disposed to be inclined, but the air filter may not be inclined. For example, the air filter may be disposed vertically.

In addition, in the present embodiment, the pair of outlet tubes is formed with different lengths, but the pair of outlet tubes may be formed with the same length.

In addition, the air cleaner may be applied not only to the straddle-type vehicle shown in the drawings, but also to other types of straddle-type vehicles. The straddle-type vehicle is not limited to general vehicles on which a rider rides in a posture of straddling a seat, and includes a small-sized scooter-type vehicle on which a rider rides without straddling a seat.

As described above, the air cleaner (50) of the present embodiment is an air cleaner configured to be disposed behind an engine (40) and inside a vehicle body frame (10). The air cleaner (50) includes: an air cleaner case (51) in which an intake chamber (56) is formed; an air filter (57) that divides the intake chamber into a dirty side (58) and a clean side (59); an inlet tube (62) configured to take in air from a vehicle rear side to the dirty side; and an outlet tube (64) configured to send air from the clean side to the engine. The inlet tube and the outlet tube are attached to an upper side of the air cleaner case, and an expansion portion (65) is formed on a lower side of the air cleaner case, the expansion portion (65) being formed by expanding the clean side further downward than the dirty side. According to this configuration, since the inlet tube and the outlet tube are attached to the upper side of the air cleaner case, air easily flows directly from the inlet tube to the outlet tube. Therefore, the air smoothly flows toward the engine from a low rotation speed to a high rotation speed of the engine, and the engine output is improved. Since the air cleaner case is formed with the expansion portion in which the clean side is expanded below the dirty side, the volume of the clean side is sufficiently secured even in a narrow space inside the vehicle body frame. Therefore, even when the throttle is rapidly opened, the air inside the expansion portion is used to improve the engine output.

In the air cleaner of the present embodiment, a downstream end of the inlet tube and an upstream end of the outlet tube are located at substantially the same height. According to this configuration, air more easily flows from the inlet tube to the outlet tube.

In the air cleaner of the present embodiment, an upstream end of the outlet tube is directed toward the expansion portion. According to this configuration, when the throttle is rapidly opened, air easily enters the outlet tube from the expansion portion, and the engine output is improved.

In the air cleaner of the present embodiment, an upper portion of the air filter is inclined so as to be in front of a lower portion of the air filter in a side view, a downstream end of the inlet tube faces a center of a front surface of the air filter in the side view, and an upstream end of the outlet tube faces an upper portion of a back surface of the air filter in the side view. According to this configuration, the air easily flows from the inlet tube to the outlet tube with the air filter interposed therebetween, and the engine output is improved.

In the air cleaner of the present embodiment, the engine is a two-cylinder engine, and the outlet tubes are a pair of outlet tubes having different lengths. The pair of outlet tubes is formed with umbrella portions (72) that extend toward upstream ends. The upstream ends of the pair of outlet tubes are directed toward a center of the air filter. According to this configuration, since the lengths of the two outlet tubes are different from each other, even if the umbrella portions are formed in the two outlet tubes, the umbrella portions of the two outlet tubes do not interfere with each other at the center of the air filter. In addition, the output characteristics of the engine can be adjusted by changing the lengths of the two outlet tubes.

In the air cleaner of the present embodiment, the inlet tube extends from the air cleaner case to the vehicle rear side, and the expansion portion extends below the inlet tube to the vehicle rear side. According to this configuration, the expansion portion expands the clean side of the air cleaner case downward and rearward of the dirty side, such that the volume of the clean side is sufficiently secured. In addition, since the expansion portion is located below the inlet tube, the expansion portion serves as a wall to suppress suction of dust and the like into the inlet tube.

In the air cleaner of the present embodiment, the vehicle body frame includes a seat rail that supports a seat from below. The air filter is located above a lower end of the seat rail, and the expansion portion extends below the seat rail to the vehicle rear side with respect to the air filter. According to this configuration, even in a narrow space inside the seat rail, the volume of the clean side of the air cleaner case is sufficiently secured by the expansion portion. In addition, the direct flow of air from the inlet tube to the outlet tube is not hindered.

Although the present embodiment has been described, a part or all of the above-described embodiment and modifications may be combined as another embodiment.

The technique of the present invention is not limited to the above-described embodiment, and various changes, substitutions, and modifications may be made without departing from the spirit of the technical idea of the present invention. The present invention may be implemented by other methods as long as the technical idea can be implemented by the methods through advance of the technique or other derivative techniques. Therefore, the scope of the claims covers all embodiments that may be included within the scope of the technical idea.

What is claimed is:

1. An air cleaner configured to be disposed behind an engine and inside a vehicle body frame, the air cleaner comprising:
   an air cleaner case in which an intake chamber is formed;
   an air filter that divides the intake chamber into a dirty side and a dean side;
   an inlet tube configured to take in air from a vehicle rear side to the dirty side; and
   an outlet tube configured to send air from the clean side to the engine, wherein
   the inlet tube and the outlet tube are attached to an upper side of the air cleaner case, and an expansion portion is formed on a lower side of the air cleaner case, the expansion portion being formed by expanding the clean side further downward than the dirty side, and
   the expansion portion expands the clean side to the vehicle rear side with respect to the dirty side.

2. The air cleaner according to claim 1, wherein
   a downstream end of the inlet tube and an upstream end of the outlet tube are located at substantially the same height.

3. The air cleaner according to claim 1, wherein
   an upstream end of the outlet tube is directed toward the expansion portion.

4. The air cleaner according to claim 1, wherein
   an upper portion of the air filter is inclined so as to be in front of a lower portion of the air filter in a side view,
   a downstream end of the inlet tube faces a center of a front surface of the air filter in the side view, and
   an upstream end of the outlet tube faces an upper portion of a back surface of the air filter in the side view.

5. The air cleaner according to claim 1, wherein
   the engine is a two-cylinder engine, and the outlet tubes are a pair of outlet tubes having different lengths,
   the pair of outlet tubes is formed with umbrella portions that extend toward upstream ends, and
   the upstream ends of the pair of outlet tubes are directed toward a center of the air filter.

6. The air cleaner according to claim 1, wherein
   the inlet tube extends from the air cleaner case to the vehicle rear side, and
   the expansion portion extends below the inlet tube to the vehicle rear side.

7. The air cleaner according to claim 1, wherein
   the vehicle body frame includes a seat rail that supports a seat from below, and
   the air filter is located above a lower end of the seat rail, and the expansion portion extends below the seat rail to the vehicle rear side with respect to the air filter.

* * * * *